5 Sheets—Sheet 1.

F. D. ALTHAUSE & J. F. ALLEN.
HORSESHOE MACHINE.

No. 96,762. Patented Nov. 16, 1869.

Witnesses:

Inventors:

F. D. ALTHAUSE & J. F. ALLEN.
HORSESHOE MACHINE.

No. 96,762. Patented Nov. 16, 1869.

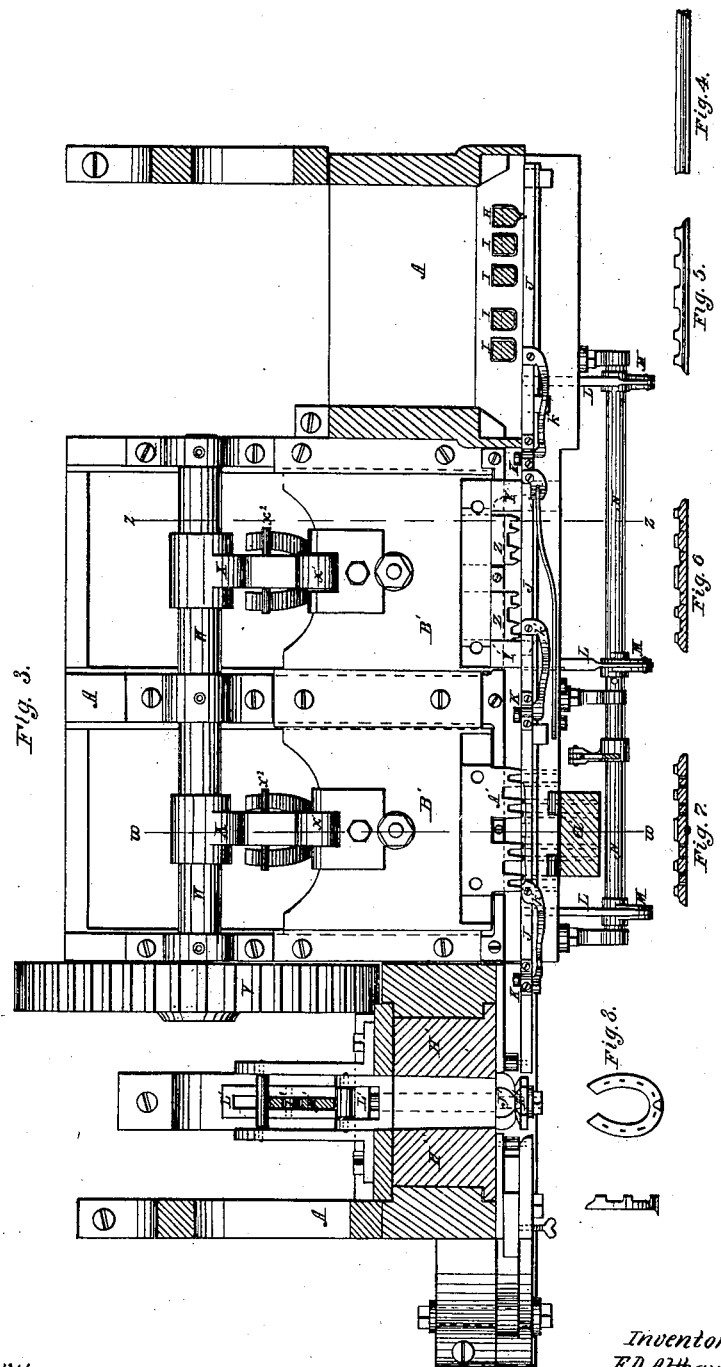

5 Sheets—Sheet 4.
F. D. ALTHAUSE & J. F. ALLEN.
HORSESHOE MACHINE.
No. 96,762.　　　　　　　　　Patented Nov. 16, 1869.
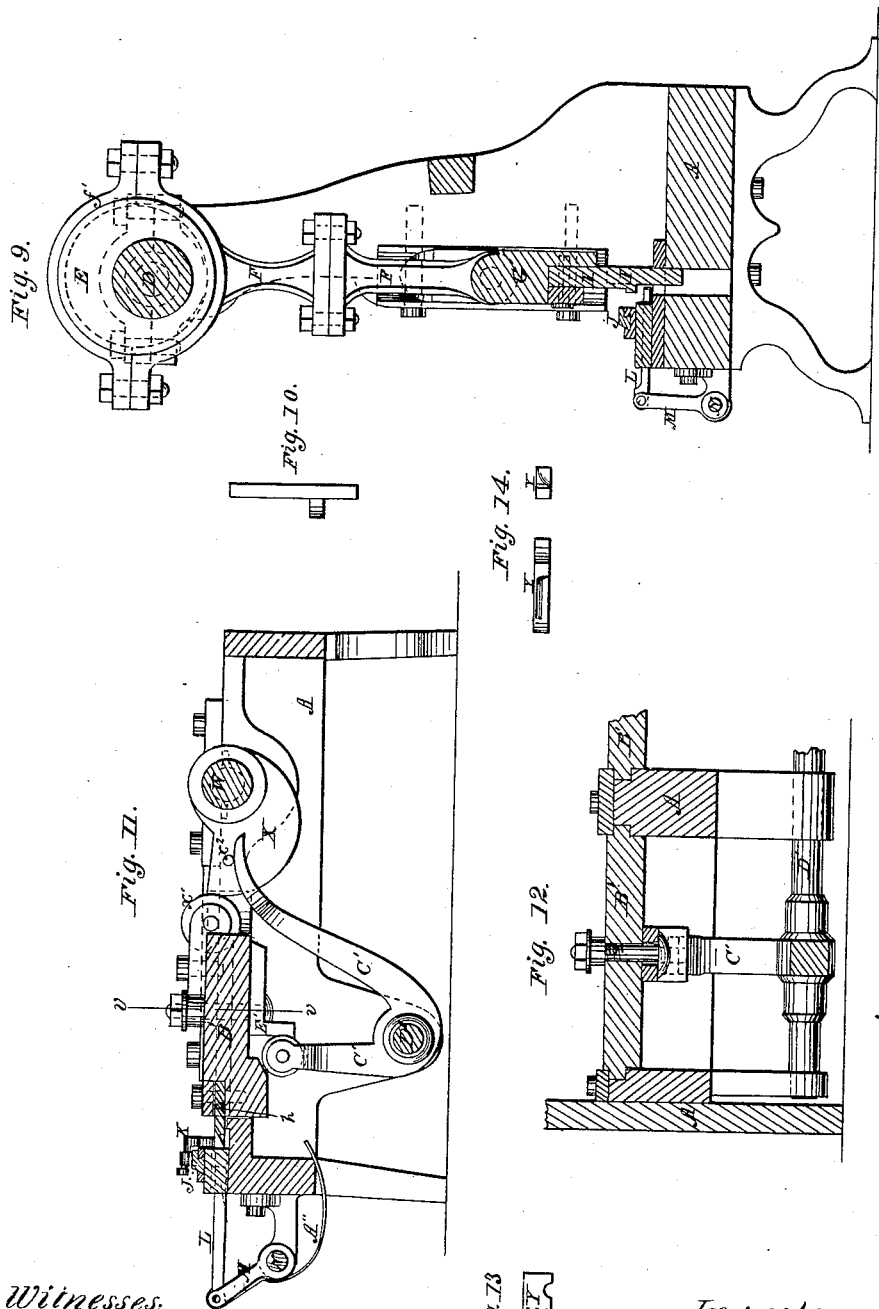
Witnesses:
A. W. Almquist
Wm Dean Overell
Inventors:
F. D. Althause and
J. F. Allen
per Munn & Co
Attorneys 5 Sheets—Sheet 5.
F. D. ALTHAUSE & J. F. ALLEN
HORSESHOE MACHINE.
No. 96,762. Patented Nov. 16, 1869.
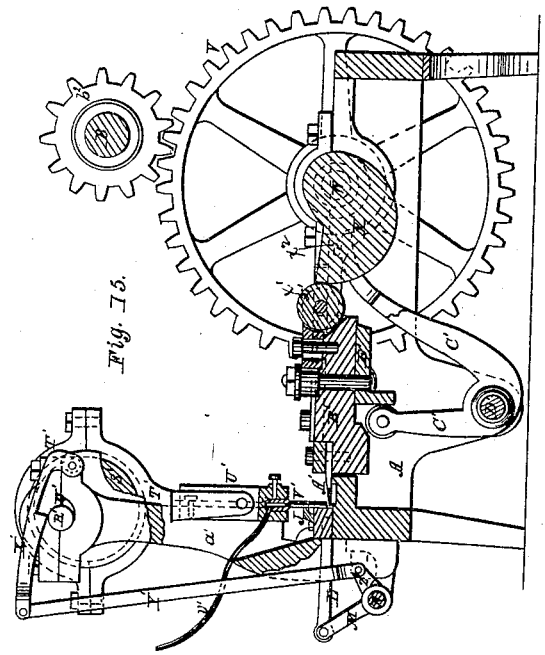
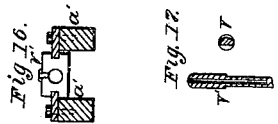
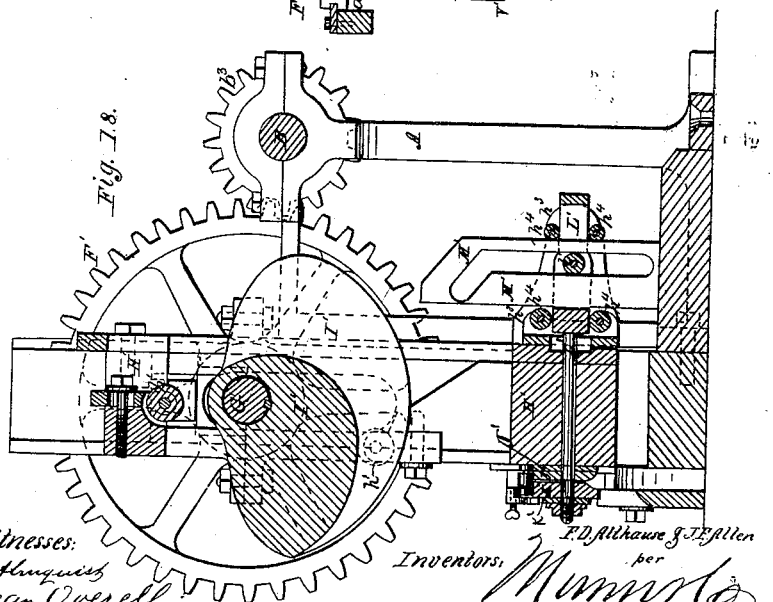

United States Patent Office.

FREDERICK D. ALTHAUSE, OF MORRISANIA, AND JOHN F. ALLEN, OF TREMONT, NEW YORK.

Letters Patent No. 96,762, dated November 16, 1869.

IMPROVED HORSESHOE-MACHINE.

The Schedule referred to in these Letters Patent and making part of the same.

*To all whom it may concern:*

Be it known that we, FREDERICK D. ALTHAUSE, of Morrisania, in the county of Westchester, and State of New York, and JOHN F. ALLEN, of Tremont, in the county of Westchester, and State of New York, have invented a new and useful Improvement in Machines for Making Horseshoes; and we do hereby declare that the following is a full, clear, and exact description thereof, which will enable others skilled in the art to make and use the same, reference being had to the accompanying drawings, forming part of this specification.

Figure 1:
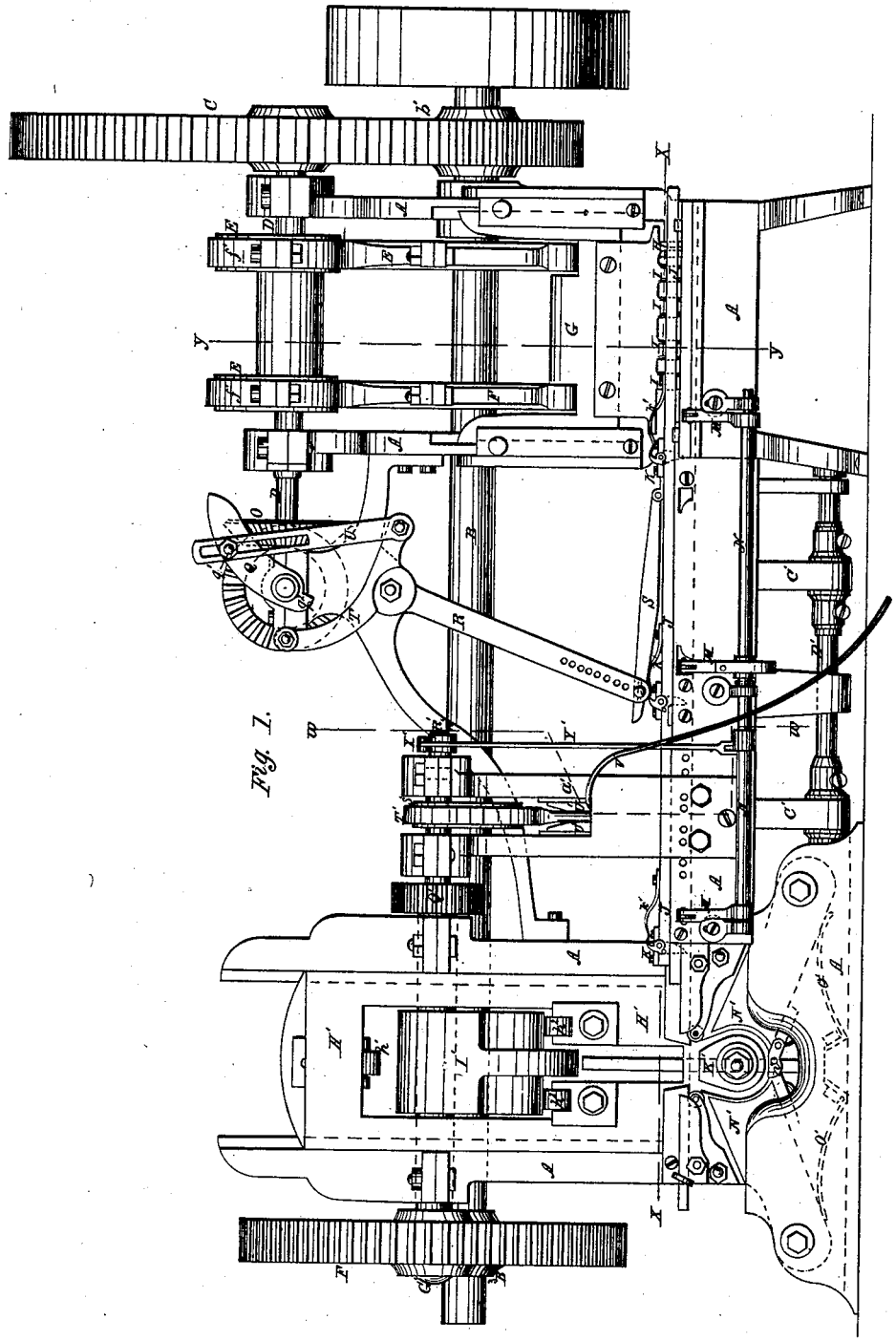

Figure 1, Plate I, is a front view of our improved machine.

Figure 2:
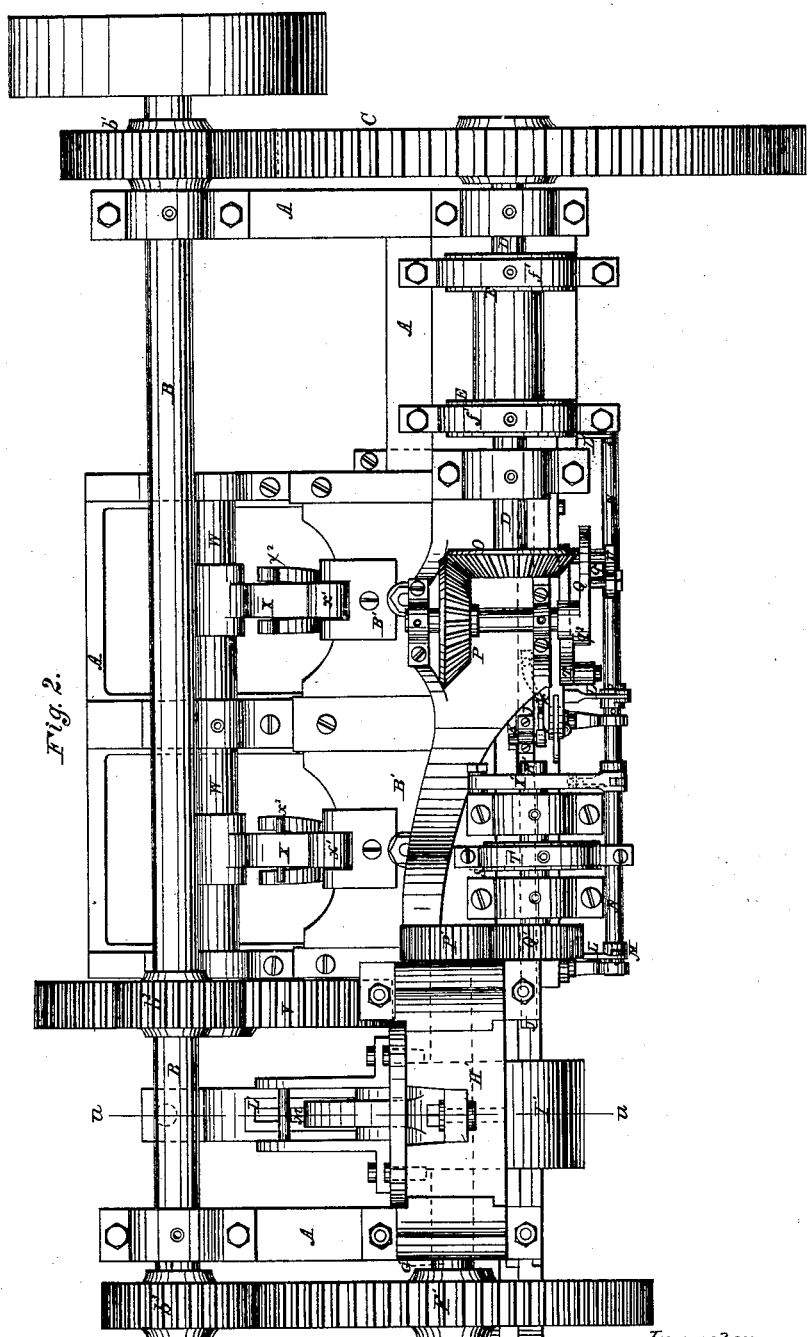

Figure 2, Plate II, is a top view of the same.

Figure 3, Plate III, is a horizontal section of the same, taken through the line $x\ x$, fig. 1.

Figures 4, 5, 6, 7, 8, Plate III, are detail views, representing the shoe at different stages of construction.

Figure 9, Plate IV, is a detail vertical section, taken through the line $y\ y$, fig. 1.

Figure 10, Plate IV, is a detail view of one of the dies.

Figure 11, Plate IV, is a detail vertical section, taken through the line $z\ z$, fig. 2.

Figure 12, Plate IV, is a detail vertical section, taken through the line $v\ v$, fig. 2.

Figures 13 and 14, Plate IV, are detail views of one of the dies for forming the ends of the shoes.

Figure 15, Plate V, is a detail sectional view, taken through the line $w\ w$, figs. 1 and 3.

Figure 16, Plate V, is a detail view of the socket for holding the scarf-punch.

Figure 17, Plate V, are detail sectional views of the scarf-punch.

Figure 18, Plate V, is a detail vertical section, taken through the line $u\ u$, fig. 2.

Similar letters of reference indicate corresponding parts.

Our invention has for its object to furnish an improved machine for forming horseshoes, which shall be so constructed and arranged that the hot bars may be fed in at one end of the machine and come out at the other end in the form of perfect shoes; and It consists in the construction and combination of various parts of the machine, as hereinafter more fully described.

A represents the frame-work of the machine.

B is the drive-shaft, which revolves in bearings attached to the rear part of the frame-work A, and to which power is applied in the ordinary manner.

To the shaft B is attached a small gear-wheel, $b'$, the teeth of which mesh into the large gear-wheel C, attached to the short shaft D, that revolves in bearings attached to the forward part of the frame A.

To the shaft D are attached, or upon it are formed, two cams, E, with which are connected the rods F by the straps $f'$.

The lower ends of the rods or bars F are pivoted to the slide G, which moves up and down in grooves or ways in the frame A.

To the slide G are secured the die H, by which the proper length is cut from the bar, and the dies I, by which pieces are cut from the edge of the bar forming the calks, and bringing the piece cut from the bar into the form shown in fig. 5.

The die H is so formed as to cut the bar in such a way as to leave the end of the piece cut off in about the form required for the end of the shoe, and the end of the bar in about the form required for the end of the next shoe.

The dies H I pass down through holes in the stationary die-plate, and should enter a water reservoir, so as to be cooled after each cut.

The cutters of the dies H I are formed upon the forward sides of the bodies of said dies, and are so formed as to leave a way or space above said cutters, for the bar or shoe to be fed forward through, while the lower parts of the dies are in the water, as shown in fig. 9.

The bar, when being operated upon, is placed in a groove, in the forward part of the bed-plate of the machine, and is fed forward from one set of dies to another, by the sliding bar J, which slides in guides attached to the said bed-plate.

To the inner side of the bar J are attached small dogs or pawls K, which, when the bar J is being drawn back, slide over the pieces of the bar, or rather the partially-formed shoes, and drop down at their rear ends, so that the said pieces are carried forward by and with the said bar in its forward movement, the movements of the bar J being so regulated as to leave the said pieces in the exact positions for them to be operated upon by the dies.

The dogs or pawls K are thrown down at the rear ends of the said pieces or shoes, by small springs $k'$ attached to the said bar, and connected with the said dogs or pawls.

The stopping of the pieces or shoes at the exact point required is further insured by the stops L, which pass in through holes in the front edge of the bed-plate, and the outer ends of which are pivoted to arms M, attached to the rock-shaft N, which works in bearings attached to the front of the bed-plate or frame-work, and which is operated at the proper time in the manner hereinafter described.

To the inner end of the short shaft D is attached a small bevel-gear wheel O, the teeth of which mesh into the teeth of the small bevel-gear wheel P, the journals of which revolve in bearings attached to the frame-work A of the machine, and to one of said journals is attached a cam, Q.

R is a bar, the lower end of which is pivoted to the end of the connecting-bar S, by a screw or bolt passing through one or the other of the holes in the adjacent ends of the said bars R S.

The other end of the bar S is pivoted to the sliding feed-bar J.

The upper part of the bar R is pivoted to the frame A, and to its upper end is attached, or upon it is formed, the unequal-armed cross-head T, which is made in about the form shown in fig. 1, and to the upper end of which is pivoted a friction-roller, against which the cam Q acts, the effect of which action being to push the feed-bar J back.

To the other, or lower end of the cross-head T, is pivoted the lower end of the bar U, the upper part of which is slotted, to receive a pin, $q^1$, attached to the outer side of the cam Q, which pin $q^1$ strikes against the bottom of the slot in the said bar U, to move the sliding bar J forward with a quick movement to feed the pieces or shoes forward to the next set of dies.

The back movement of the sliding feed-bar J is made as the dies are being drawn back, and the forward movement or feed is made while said dies are stationary or advancing to their work.

As the pieces or shoes are moved forward to their places, the small cam $q^2$, formed upon the base of the cam Q, strikes the friction-roller of the cross-head T, and moves the feed-bar back a very little, to keep the dogs or pawls K out of the way of the dies.

To the drive-shaft B is attached a second small gear-wheel, $b^2$, the teeth of which mesh into the large gear-wheel V, attached to the short shaft W, which revolves in bearings attached to the lower rear part of the frame A.

To the shaft W are attached two cams, X, for operating the two sets of dies Y Z and A' that finish the ends, and countersink and complete the nail-holes of the shoes.

The dies Y round off and finish the ends of the shoes, and the dies Z, which are attached to the same plate with the dies Y, countersink and form the tapering parts of the nail-holes, the formation of the nail-holes being completed by the dies A', attached to another die-plate, and at a subsequent operation.

The cams X act against the rear edge of the die-plates B', or rather against friction-rollers X', pivoted to the said rear edges, to force the dies Y Z A' forward to do their work.

The die-plates B' are moved back by the bent levers C', which are pivoted at their angles to a bar, D', attached to supports secured to the lower part of the frame A, and the upper ends of the forward arms of which strike against stops or projections E', formed upon or attached to the under sides of the die-plates B'.

The ends of the rear arms of the bent levers C' are slotted, to allow the cams X to pass through them, and are operated, to draw the die-plates B' back, by the pins $x^2$, passed through said cams X, and projecting upon both sides of said cams, as shown in figs. 2, 3, and 11.

To the driving-shaft B is attached a third small gear-wheel, $b^3$, the teeth of which mesh into the teeth of the large gear-wheel F', attached to the outer end of the short shaft G.

The shaft G' passes through and works in bearings in the upper forward part of the frame A, and passes through vertical slots in the sliding frame H', and has a triple cam, I', formed upon or attached to it, the middle part of which strikes against the top cross-bar, or rather against a friction-roller, $h^1$, pivoted to the top cross-bar of the sliding frame H', to raise said frame.

The side parts of the cam I' strike against friction-rollers $h^2$, pivoted to the lower part of the sliding frame H', to force said frame downward, to bend the shoe into the desired form.

J K' is the die or former, by and around which the shoe is bent or formed.

The die J K' is made in two parts, an inner part, J', which is stationary, and which is rigidly attached to or formed solidly upon the forward side of the lower part of the sliding frame H', and an outer movable part, K', which is secured to the outer end of the stem L', which passes in horizontally through a hole in the lower part of the sliding frame H'.

The rear end of the stem L' is slotted, or has a slotted bar attached to it, through which slot passes the stationary standard M', through a slot in which passes a pin, $l'$, provided with a friction-roller, and attached to the slotted part of the stem L'.

The upper part of the slot in the standard M' is inclined forward, as shown in fig. 18, so that, as the sliding frame H' is moved up and down, the said inclined part of the slot in the standard M' will move the movable part K' of the die J' K' forward, to drop the completed shoe, and back again to its working position, ready to form another shoe.

The rear end of the stem L' moves back and forth in a guide-support, $h^3$, attached to the sliding frame H', and which is provided with friction-rollers $h^4$, placed above and below the stem L', and which also rest against the front and rear edges of the standard M', to diminish the friction in the various movements of the said parts, thus relieving the guides of the sliding frame H' from all lateral strain while forming the shoe, the outward pressure upon the part K' and the inward pressure upon the part J' of the die being sustained by the standard M'.

The die J' K', in its up-and-down movement, passes through a notch in the groove through which the shoes pass, to be operated upon by the various dies. The middle part of the piece or shoe to be operated upon, lies across this notch, and is forced into and through it, by the descent of the die J' K', the edges of the said notch, against which the shoe bears, being provided with rollers to diminish the friction.

N' is the lower die, which is made in two parts, pivoted at their outer ends in recesses in the frame or bed-plate of the machine.

The inner ends or jaws of the die N' are held up and open to receive the shoe by the springs O', placed beneath them in the recess in which they work.

$n'$ is a projection or toe, attached to or formed upon the side of the lower point of the one part and overlapping the point of the other part, and which performs the double purpose of a guide, to keep the two parts always in line with each other; and, second, to give form to the toe-scarf of the shoe.

As the shoe is forced down into the die N', the die N' is also forced downward, closing the jaws of said die and forming the shoe, which jaws are again opened by the action of the springs O', when the die J' K' is again raised, allowing the said die J' K' and the completed shoe to rise out of the said die N'.

To the inner end of the short shaft G' is attached a small gear-wheel, P', the teeth of which mesh into the teeth of the small gear-wheel Q', attached to the end of the short shaft R', which revolves in bearings attached to a standard, $a'$, attached to the forward side of the frame A, directly opposite the centre of the set of dies by means of which the formation of the nail-holes is completed.

To the shaft R' is attached, or upon it is formed, a cam, S', with which is connected the upper end of the connecting-rod T', to the lower end of which is pivoted the socket-plate U', which slides up and down in ways or grooves in the standard $a'$, and to which is secured the punch V', by which the toe-scarf is formed in the shoe.

The punch V' has a hole formed in it, with which is connected a small tube or pipe, $v'$, the other end of which should be connected with some suitable water-reservoir, to keep the said punch V' cool.

To the projecting end of the shaft R' is attached, or upon it is formed, a small cam, W', upon which rests the lever X', the inner end of which is pivoted to the standard $a'$, and to its outer or forward end is pivoted the upper end of the connecting-bar Y', the lower end of which is pivoted to the arm Z' attached to the rock-shaft N, that operates the stops L, as hereinbefore described, so that when the shoulder of the lever X' drops from the shoulder of the cam W', the rock-shaft N will be rocked or operated by the spring or springs A'', connected with one or more of the arms M of said shaft, and pressing against the frame A of the machine.

As the lever X' is raised by the cams W', the stops L will be again withdrawn.

Having thus described our invention,

We claim as new, and desire to secure by Letters Patent—

1. The combination of the stationary guide-standard M', slotted as shown, the sliding die-stem L', dies J' and K', and sliding die-plate H', substantially as herein shown and described, and for the purpose set forth.

2. The device for operating the sliding feed-bar J, formed by the combination of the cam $Q$ $q^1$ $q^2$, push-bar U, cross-head connecting-bar T R, and connecting-bar S with each other, and with the said feeding-bar J, substantially as herein shown and described, and for the purpose set forth.

3. The combination of the die J' K', constructed and arranged to operate as described, with the die N' and sliding frame or plate H', substantially as herein shown and described, and for the purpose set forth.

4. Combining, in a single machine, the dies for cutting off the bar, forming the calks, punching the nail-holes, forming the toe-scarf, and bending and finishing the shoe, substantially in the manner herein shown and described.

5. The hollow punch V', for forming the toe-scarf, in combination with the other parts of a horseshoe machine, substantially as herein shown and described.

The above specification of our invention signed by us, this 4th day of September, 1869.

F. D. ALTHAUSE.
      JOHN F. ALLEN.

Witnesses:
 GEO. W. MABEE,
 A. W. ALMQUIST.